United States Patent Office 3,829,534
Patented Aug. 13, 1974

---

3,829,534
PROCESS FOR PREPARING KETO-CONTAINING PHOSPHONATES
Joseph John Dickert, Jr., Lower Makefield Township, Pa., and Albert Lloyd Williams, Hopewell Township, N.J., assignors to Mobil Oil Corporation
No Drawing. Filed July 3, 1972, Ser. No. 268,391
Int. Cl. C07f 9/38; C10m 1/46
U.S. Cl. 260—970
6 Claims

ABSTRACT OF THE DISCLOSURE

Novel compounds having utility as anti-wear agents for industrial compositions have the structure:

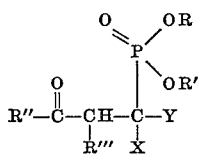

wherein R and R' may be hydrocarbyl, substituted hydrocarbyl, heterocyclic or members of the same cyclic hydrocarbyl group; R'', R''' and X may each be hydrocarbyl or substituted hydrocarbyl, and R''' and X may be hydrogen as well, and either R'' or R''' may be linked to X through one or more carbon atoms as follows:

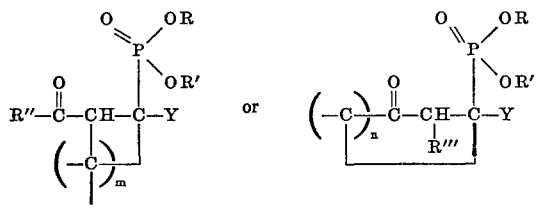

integers $m$ and $n$ being at least 2 and 1, respectively, the dangling valences being attached to hydrogen or hydrocarbyl groups; and Y may be hydrogen or alkyl of from 1 to about 16 carbon atoms. These compounds may be prepared by novel reaction between a 2-olefin-1-one and an organo hydrogen phosphite.

CROSS-REFERENCE TO RELATED APPLICATIONS

None.

BACKGROUND OF THE INVENTION

Field of the Invention

This invention relates to novel adducts of unsaturated ketones and organic phosphites, and in particular, it relates to compositions containing such adducts as additives.

Summary of the Prior Art

U.S. 3,247,113 describes reaction between dimer acrolein and dialkyl phosphite. The resulting product is an adduct in which the phosphorus atom is attached to the carbonyl carbon. The disclosure also indicates that the reaction can be carried out with ketones as well, presumably by similar addition. In U.S. 3,268,450 there is described a reaction between a phosphite, an aminoacrylate and an aldehyde or ketone. Again the reaction involves only the carbonyl group. In U.S. 3,591,501, there is disclosed a hydroxy-substituted organophosphine oxide. This product may be prepared by reacting a phosphine oxide with a ketone. The oxygen of the carbonyl group becomes reduced to a hydroxy group and the phosphorus atom is attached to the carbonyl carbon. In all of these three references, the carbonyl group is the only substituent involved in the reaction. There is no showing in these references of an addition reaction between an organo phosphite and the double bond of an olefinic ketone.

SUMMARY OF THE INVENTION

It has now been discovered that novel compounds, in which the molecule contains the group:

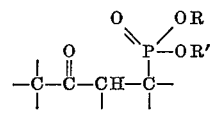

wherein R and R' may also be organo radicals, preferably hydrocarbyl, substituted hydrocarbyl, or heterocyclic, or members of the same interconnected divalent organic radical and the dangling valences may be attached to hydrogen, organo, substituted organo or non-organo groups, or two valences, preferably including one valence from the right end carbon atom shown in the above group, are interconnected directly or indirectly, have antiwear properties and may be used as additives in industrial fluids and other compositions. The method of preparing these compounds involves the reaction between an unsaturated ketone having at least one double bond conjugated with the carbonyl bond (2-olefin-1-one) and an organo hydrogen phosphite.

DESCRIPTION OF SPECIFIC EMBODIMENTS

The novel compounds used in the industrial fluid compounds of this invention are prepared by reacting unsaturated ketones with diorgano hydrogen phosphites. The olefinic bond of the unsaturated ketone is conjugated, that is, the second bond from the carbonyl group is unsaturated as follows:

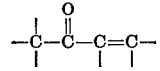

the dangling valences being attached to the above-identified groups.

More specifically, the ketones used herein have the structure:

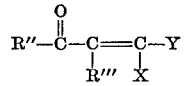

wherein R'', R''' and X may each be alkyl, aryl, aralkyl, or alkaryl of 1 to about 40, and preferably 1 to about 20, carbon atoms and R''' and X may also be hydrogen, and said groups containing substituents which include hydroxy, halogen, nitro, cyano and the like, and furthermore, R'' and R''' may be interconnected with X; and Y may bt hydrogen or alkyl of from 1 ot about 16 carbon atoms. Y is most preferably either hydrogen or alkyl of 1 to about 10 carbon atoms.

Suitable unsaturated ketones in this invention include the alkyl vinyl-type ketones, such as methyl vinyl ketone, ethyl vinyl ketone, butyl vinyl ketone, octyl vinyl ketone, decyl vinyl ketone, hexadecyl vinyl ketone, cyclohexyl vinyl ketone, chlorodecyl vinyl ketone, mesityl oxide, methyl propenyl ketone, ethyl propenyl ketone, butyl propenyl ketone, methyl isobutenyl ketone, and the like; and aryl, alkaryl and aralkyl vinyl-type ketones, such as phenyl vinyl ketone, benzyl vinyl ketone, benzyl propenyl ketone, benzyl butenyl ketone, phenylethyl vinyl ketone, naphthylmethyl vinyl ketone, and the like. The unsaturated ketone may also be a cyclic compound in which R'' or R''' are connected to X. The most preferred of these have the structures:

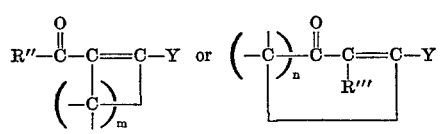

wherein $m$ is an integer of at least 2 and preferably 3 to 7 and $n$ is an integer of at least 1 and preferably from 2 to 6.

Included are such ketones as 2-cyclopenten-1-one or 2-cyclohexen-1-one, and hydrocarbyl or non-hydrocarbyl substituted derivatives thereof. The unsaturated ketones can also be part of a separate heterocyclic group, wherein R″ or R‴ and X are part of the heterocyclic ring, such as thiophene, or non-basic nitrogen rnigs, e.g., pyran, thiapyran, and the like. Diolefinic ketones, such as divinyl ketone, may also be used.

The phosphite reactants useful in the invention may have the general formula:

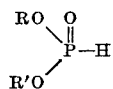

wherein each R and R' individually may be hydrocarbyl, such as alkyl, aryl, alkaryl or aralkyl, having from 1 to about 40 carbon atoms, and substituted hydrocarbyl groups having such substituents as hydroxy, halo, nitro, sulfo, cyano, and the like. Alternatively, the phosphite reactant may contain an interlinked organo group such as:

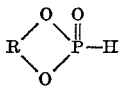

in which the R in this case is of the same group types as for R and R' above except it is divalent. Accordingly, the phosphite reactant in this invention may include dimethyl phosphite, diethyl posphite, dipropyl phosphite, dibutyl phosphite, dioctyl phosphite, dichloroethyl phosphite, dichlorobutyl phosphite, diphenyl phosphite, di(chlorophenyl) phosphite, dibenzyl phosphite, ditolyl phosphite, dinonylphenyl phosphite, di(nitrophenyl) phosphite, di(ethylbenzyl) phosphite, methyl phenyl phosphite, butyl tolyl phosphite; and ethylene glycol diphosphite, catechol diphosphite, chlorophenylene diphosphite and the like.

In the reaction, the ketone and phosphite are mixed together and heated to a temperature of from about 80° to about 200° C., and preferably from about 100° to about 175° C., for a sufficient period of time to effect the addition reaction. Preferably, the reaction mixture is held under a nitrogen atmosphere. The mixture is then allowed to cool and subjected to vacuum distillation. Infra-red analysis has indicated that the P—H bond of the phosphite has added across the olefinic bond of the unsaturated ketone and the carbonyl group remains intact. Yield may be obtained from 70% to as high as 95% of theoretical.

It has been noted that, although the products of this invention are understood to contain the aforementioned bond group, molecular weight determinations have indicated the presence of heavier molecules than expected, although elemental analysis may be within expected limits. This result, although not completely understood, could be evidence of the presence of polymers, e.g., dimers. For this reason, the entire reaction mixture of the above reaction is also deemed to be part of this invention.

The additives of this invention have shown excellent anti-wear properties in such industrial fluids, as mineral oil lubricants, synthetic lubricants, particularly the synthetic ester lubricants useful in jet aircraft lubrication. These additives may also be used in the preparation of greases, transmission fluids, and fuels where wear problems arise. The additives of this invention may be used in conjunction with other conventional additives for industrial compositions, such as anti-oxidants, detergents, flow regulating additives, and the like. Since these additives are non-metallic compounds, they cause no problems with regard to the formation of ash which often occurs with metallic additives in compositions subjected to oxidation during use.

The sequence of the reaction of this invention is understood to proceed substantially as follows:

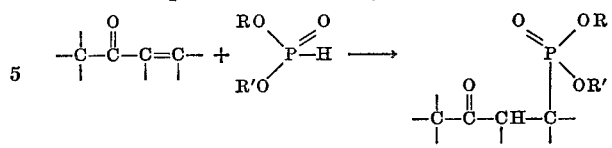

the dangling valences being attached to the aforenamed groups. Thus the phosphorus group of the phosphite attaches to the beta (or right-end) carbon of the ketone and the hydrogen atom to the alpha. Seen with all R groups, this reaction may be as follows:

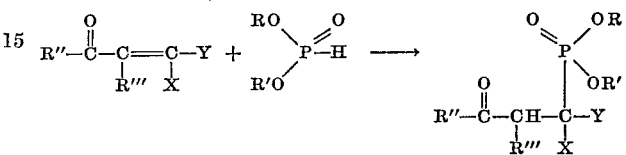

wherein R, R', R″, R‴, X and Y have the aforementioned identities.

Having described our invention in broad terms, the following examples are offered to illustrate further aspects of this invention although they do not limit the invention in any way. Percentages and parts used in these examples are by weight only.

EXAMPLE 1

Into a reaction flask equipped with a stirrer, thermometer, a reflux condenser, and a nitrogen inlet tube were added 96 grams (1 mole) of 2-cyclohexen-1-one and 110 grams (1 mole) of dimethyl hydrogen phosphite. The reaction mixture was stirred and heated at about 125° C. for about an hour under a nitrogen atmosphere. The mixture was allowed to cool and stripped to a maximum pot temperature of about 78° to 80° C. at about 2 to 3 mm. Hg. The residue accounted for about 75% to about 80% of theory of a 1:1 adduct.

Analysis.—Calc. for $C_8H_{15}O_4P$ (percent): C, 46.6; H, 7.3%; P, 15.0. Found (percent): C, 46.3; H, 7.2; P, 13.8.

The infra-red spectrum of the product in chloroform solution was consistent with the addition of the P—H of the phosphite across the olefinic bond of the cyclohexenone. The structure of the adduct of this example is believed to be:

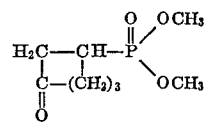

The molecular weight (in chloroform) by vapor pressure lowering was 435 indicating the possible presence of polymers.

EXAMPLE 2

Using the same conditions as in Example 1, 8.4 grams (0.1 mole) of ethyl vinyl ketone was reacted with 11.0 grams (0.1 mole) of dimethyl hydrogen phosphite. The residual product after vacuum distillation was about 62% of theoretical.

Analysis.—Found (percent): C, 49.4; H, 7.8; P, 13.9.

EXAMPLE 3

Using the same conditions as in Example 1, 73 grams (0.5 mole) of trans-4-phenyl-3-buten-2-one was reacted with 55 grams (0.5 mole) of dimethyl hydrogen phosphite. The residual product after vacuum distillation was about 60 grams. The infrared spectrum indicated reaction at both the carbonyl group and the double bond of the keto-olefin.

EXAMPLE 4

Using the same conditions as in Example 1, 48 grams (0.5 mole) of 2-cyclohexen-1-one was reacted with 117 grams (0.5 mole) of diphenyl hydrogen phosphite. The residual product after vacuum distillation was about 138 grams (84%). The molecular weight, using the method indicated in Example 1, was 594. A sample of the product was dissolved in benzene, water, washed, dried and recovered. The molecular weight of the washed product was 542.

*Analysis.*—Calc. for $C_{18}H_{19}O_4P$ (percent): C, 65.5; H, 5.8; P, 9.4. Found (percent): C, 65.3; H, 5.9; P, 9.7.

This phosphite was also reacted with mesityl oxide to product a product in accordance with this invention.

EXAMPLE 5

Using same apparatus as described in Example 1, 5.00 grams (.046 mole) of dimethyl hydrogen phosphite and 4.95 grams (.045 mole) of 4,4-dimethylcyclohexene were mixed and heated at 114° to 116° C. (maximum reflux temperature) for about 6⅓ hours. There was no change in boiling temperature and after cooling there were two layers. No apparent reaction took place.

EXAMPLE 6

Using the same conditions described in Example 1, 68 grams (0.5 mole) of pinene was mixed with 55 grams (0.5 mole) of dimethyl hydrogen phosphite. After 2 hours heating and stirring and then cooling to room temperature, the original 2 immiscible layers were obtained; no apparent reaction took place.

EVALUATION OF THE PRODUCT

The products of this invention have been evaluated in standard anti-wear tests.

1. Four Ball Wear Test

In this test, three one-half inch diameter steel balls of 52-100 steel are held stationary in a steel cup containing the test lubricant. A fourth ball positioned on a vertical spindle is brought into contact with the three stationary balls may be varied according to the desired load. The temperature of the lubricant, the rotational speed and the duration of the test may also be varied. At the end of the test, the wear scars on the stationary steel balls are measured. The average diameter of the wear scars and the rate of wear per unit of sliding distance represent a measure of evaluating the lubricant as an anti-wear agent.

The product of Example 1 was tested in a SAE 90 paraffinic base mineral oil containing 1% of the additive. The oil was tested alone for comparison purposes. The following results were obtained:

| Lubricant | Wear scar diameter, mm. | Wear rate, cc./cm. ($\times 10^{11}$) | K* ($\times 10^8$) |
|---|---|---|---|
| (1) At 40 kg. load, 300° F., 30 minutes, 600 r.p.m.: | | | |
| Oil alone | 0.60 | 4.2 | 18 |
| Oil plus additive | 0.39 | 0.47 | 2.0 |
| (2) Same as 1, except 3,000 r.p.m.: | | | |
| Oil alone | 2.4 | 240.0 | 1,050 |
| Oil plus additive | 0.56 | 0.61 | 2.7 |
| (3) Same as 1, except 100 kg. load: | | | |
| Oil alone | 1.1 | 47.0 | 85 |
| Oil plus additive | 0.58 | 2.9 | 5.1 |
| (4) Same as 1, except 550° F.: | | | |
| Oil alone | 0.99 | 35.0 | 150 |
| Oil plus additive | 0.44 | 0.92 | 4.1 |

*K=Wear rate×hardness of steel.

2. Ryder Gear Rig Test

The apparatus for this test is described in U.S. 3,418,240, and Federal Test Method Std. No. 791 B, Method 6508.1, Jan. 15, 1969. The test lubricant is a pentaerythritol ester of mixed carboxylic acids containing, as the anti-wear agent, 1% of the product of Example 1. The average scuff load was 3,620 p.p.i.

Modifications and variations of the invention as set forth hereinabove may be made without departing from the spirit of the invention except as limited by the following claims:

We claim:

1. In the method of preparing a compound having the structure

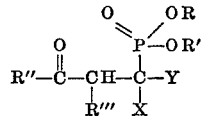

in which a conjugated unsaturated ketone is reacted with a dihydrocarbyl hydrogen phosphite, wherein R and R′ are individually selected from the group consisting of alkyl, aryl, aralkyl and alkaryl having from 1 to about 40 carbon atoms, R″ is selected from the group consisting of alkyl and aralkyl having from 1 to about 40 carbon atoms, and R‴ and X are individually selected from the group consisting of hydrogen, alkyl, aryl, alkaryl, and aralkyl having from 1 to about 40 carbon atoms, and additionally R‴ and X may be members of the same divalent cyclic hydrocarbyl group, and Y is selected from the group consisting of hydrogen and alkyl of from 1 to about 16 carbon atoms, the improvement comprising mixing the said ketone and the said phosphite and heating the mixture at a temperature of from 100° to about 175° C. in the absence of a catalyst.

2. The method of claim 1 wherein the unsaturated ketone is 2-cyclohexen-1-one.

3. The method of claim 1 wherein the unsaturated ketone is 4-phenyl-3-buten-2-one.

4. The method of claim 1 wherein the unsaturated ketone is mesityl oxide.

5. The method of claim 1 wherein the unsaturated ketone is ethylvinyl ketone.

6. The method of claim 1 wherein R and R′ are selected from the group consisting of methyl and phenyl.

References Cited

UNITED STATES PATENTS

| | | | |
|---|---|---|---|
| 2,268,158 | 12/1941 | Marvel | 260—946 |
| 2,616,918 | 11/1952 | Johnston | 260—946 |
| 2,971,019 | 2/1961 | Ladd et al. | 260—946 |
| 3,048,613 | 8/1962 | Ladd et al. | 260—946 X |

ANTON H. SUTTO, Primary Examiner

U.S. Cl. X.R.

252—49.8; 260—937, 946